3,399,995
ANTISTATIC BACKING LAYERS FOR PHOTOGRAPHIC FILM

Alan M. Winchell, Windsor, N.Y., assignor to GAF Corporation, a corporation of Delaware
No Drawing. Filed May 6, 1965, Ser. No. 453,820
4 Claims. (Cl. 96—87)

This invention relates to photographic film and particularly to a photographic film having antistatic properties.

It is well established that photographic films have a strong tendency to acquire and accumulate static electricity. Such static electrification can occur during the manufacture of the filmbase during subsequent emulsion coating, trimming and packaging operations; or by operation in cameras, particularly in motion picture cameras and cameras used for X-ray fluorography where a series of pictures is taken in rapid succession. The sudden discharge of these static charges, after a light-sensitive emulsion coating has been applied to the filmbase, causes typical "static" markings in the photographic emulsion and these become visible upon development.

Static marks are especially troublesome in films which must be manufactured without an antihalation backing layer and are, therefore, deprived of the antistatic protection normally provided by such layers during the manufacturing operation. Considerable static electricity is generated and eventually given off in the form of spark discharges when such a film without an antihalation layer or other antistatic protection is wound into a tight roll and subsequently unwound; for instance, during coating or while being unwound in a camera magazine. The results of these spark discharges show up in the developed film as black spots, streaks, lines, irregular fogged patterns, or combinations thereof.

Of the various supports currently utilized for the production of photographic film, those prepared from inert plastics, particularly polycarbonates, polyesters, polystyrene, polyethylene terephthalate, have a great tendency to acquire rather high electrical charges. When the film is passed over another film surface or over highly polished metal surfaces, this tendency becomes especially pronounced. Antistatic protection of inert plastic film supports of the type mentioned above is especially difficult to achieve under conditions of low humidity. The coating operation has, therefore, been carried out at relatively high humidity levels with adverse influence upon the photographic characteristics of the emulsion. Even this precaution is no cure-all because the taking of the picture and the processing of the film is often carried out in dry climates with exceptionally low humidity conditions.

It has been attempted to overcome the generation of static in films by incorporating electrolytes or hygroscopic substances into the subbing compositions for the emulsion side with the intent to impart conductivity to the film and to dissipate the static electricity before discharge and spot exposure of the emulsion. Unfortunately, most of these additives are incompatible with the subbing compositions which contain the inert plastic and gelatin dispersed in organic solvents and thus introduce manufacturing difficulties.

It has also been proposed to overcome the static caused in films without antihalation layers by the use of a special thin antistatic backing layer or "back-wash" which confers upon the treated film some measure of antistatic protection but introduces at the same time new complications. Typically, these antistatic layers use polymers and copolymers derived from unsaturated carboxylic acids as described in United States Patent 2,074,647. These layers which have to be applied before the emulsion coating are usually quite tacky to the extent that they are subject to offset, blocking and poor slippage. Consequently, the unwinding of the filmbase which precedes the emulsion coating operation requires considerable force with the result that the separation of the rolled-up film causes formation of new centers of static electricity. Besides, the tackiness of the antistatic backing layer leads to a certain friction between the backing layer and the rollers of the coating machine, thus reducing the slippage properties and increasing the coefficient of friction, again contributing to the formation and discharge of static electricity.

The principal object of the present invention, therefore, is to provide photographic film supports which will possess improved slippage and antistatic properties.

It has now been discovered that film supports, especially photographic motion picture film prepared from inert plastics such as polycarbonates, polyesters, polystyrene, polyethylene terephthalate and the like, can be protected against static susceptibility by applying, coating or swabbing an inert film support of the type described or the uncoated side of a finished photographic film with polymers of vinylbenzyl quaternary ammonium compounds to produce a film thereon and thereover which is characterized by significantly lower surface resistivity and thereby less susceptible to the accumulation of static charges.

The polymers of vinylbenzyl quaternary ammonium compounds to be employed in practice of the invention can be any water-soluble or water-dispersible homopolymer or copolymer of one or more vinylbenzyl quaternary ammonium compounds, or copolymers of a predominant amount of a vinylbenzyl quaternary ammonium compound and a minor amount of a nonacidic copolymerizable compound such as acrylamide, or copolymers containing in the polymer molecules residues corresponding to from 95.0 to 99.99 percent by weight of one or more vinylbenzyl quaternary ammonium compounds and from 5.0 to 0.01 percent by weight of divinylbenzene.

More specifically, the resin can be a homopolymer or a copolymer of any two or more vinylbenzyl quaternary ammonium compounds having the general formula:

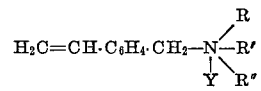

wherein R, R' and R'' each represents individually a monovalent radical selected from the group consisting of

$CH_3CHOHCH_2$—, $CH_2OHCHOHCH_2$— and alkyl, aryl cycloalkyl and aralkyl hydrocarbon radicals, and R, R' and R'' collectively represent the trivalent radical of the formula:

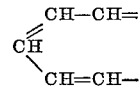

wherein the three valences are attached to the nitrogen atom, the said R groups containing a total of not more than 12 carbon atoms in the sum of the constituent radicals, or a copolymer of at least 65 percent by weight of any one or more of such vinylbenzyl quaternary ammonium compounds with not more than 35 percent by weight of acrylamide, or a copolymer containing in the polymer molecules residues corresponding to from 95.0 to 99.99, preferably from 99.0 to 99.99, percent by weight of any one or more of such vinylbenzyl quaternary ammonium compounds and from 5.0 to 0.01, preferably from 1.0 to 0.01, percent by weight of divinylbenzene and Y is an anion. Mixtures of any two or more of the homopolymers or copolymers can also be used.

The polymers are of relatively high molecular weight and are characterized by a viscosity of at least 2 centipoises for a 0.5 percent by weight solution of the polymer in an aqueous 2 percent by weight solution of sodium chloride at 25° C. as determined with an Ostwald viscosimeter. The term "viscosity" as herein employed refers to the viscosity of the aforesaid polymer solutions or dispersions under the above conditions.

In a preferred embodiment of the invention the resin substance is a homopolymer or copolymer of one or more vinylbenzyl quaternary ammonium compounds having the aforementioned general formula wherein R represents an alkyl radcal containing from 1 to 4 carbon atoms, R' and R'' each represents a radical of the group consisting of

$CH_2CHOHCH_2$—, $CH_2OHCHOHCH_2$—, and lower alkyl radicals containing from 1 to 4 carbon atoms and Y is an anion, e.g., a sulfate, a chloride, a nitrate, or a hydroxyl ion, copolymers of at least 65 percent by weight of any two or more of such vinylbenzyl quaternary ammonium compounds and not more than 35 percent by weight of acrylamide, or copolymers of from 99.0 to 99.99 percent by weight of at least one such vinylbenzyl quaternary ammonium compound and from 1.0 to 0.01 percent by weight of divinylbenzene.

The vinylbenzyl quaternary ammonium compounds to be employed in preparing the polymers for use in the invention can readily be prepared by reaction of vinylbenzyl chloride or bromide which are also known as chloromethyl styrene, or bromomethyl styrene, with a tertiary amine such as trimethylamine, triethylamine, tripropylamine, tributylamine, dimethylethanolamine, methyldiisopropanolamine, dimethylbenzylamine, dimethylaniline, dimethylcyclohexylamine, N,N-dimethylamino-1,2-propanediol, triethanolamine, methyldiethanolamine and the like. The reaction of the vinylbenzyl halide and the tertiary amine proceeds readily at temperatures between about 0° C. and 60° C., and can be carried out in admixture with, or in the presence of, a solvent or reaction medium such as water, ethyl alcohol, ethylene dichloride, toluene or the like, but a solvent is not essential.

The vinylbenzyl quaternary ammonium compounds can be polymerized alone or in admixture with one another, or in admixture with acrylamide or divinylbenzene in the proportions previously stated to form the water-soluble or water-dispersible polymers suitable for use as the electroconductive substance for use in the invention. The polymerization can be carried out in mass, i.e., in the substantial absence of an inert liquid medium, in solvents for the monomers or in a solvent for both the monomer and the polymer. Suitable solvents or polymerization media are water, lower aliphatic alcohols such as methyl alcohol, ethyl alcohol, isopropyl alcohol, or aliphatic ketones such as acetone or methyl ethyl ketone and mixtures of such compounds with water.

The polymerization is accelerated by the use of polymerization catalysts such as heat, ultraviolet light, hydrogen peroxide, sodium perborate, potassium persulfate, sodium persulfate, benzoyl peroxide, lauroyl peroxide, tertiary butyl peroxide, ditertiary butyl peroxide, tertiary butyl perbenzoate, cumene hydroperoxide or diisopropylbenzene hydroperoxide.

The polymerization of the monomers can be carried out at temperatures between 0° C. and 100° C. and at atmospheric, subatmospheric or superatmospheric pressures, but in all cases it is carried out at temperatures below the decomposition temperature of the monomeric material and at pressures sufficient to maintain the monomers in a liquid condition.

In practicing the present invention, the polymer can be dispersed in a suitable solvent such as water and preferably a lower boiling alcohol such as methanol, ethanol, propanol, or isopropanol and applied to the inert plastic filmbase by coating, dipping, brushing, or other usual ways of applying a solution or dispersion of a polymer to an inert plastic filmbase. Subsequently, the coated, inert plastic filmbase is dried to produce a final product containing a layer of the polymer.

The thickness of the dried antistatic backing layer can range from about 0.2 to 1 micron in thickness, depending upon the strength of the solution, and to a lesser extent upon the coating speed. The amount of total solids deposited upon the inert plastic filmbase can be varied from 2 to 40 milligrams per square foot, as desired, by changing the concentration of the polymer in the solution employed for the coating or dipping operation.

The photographic inert plastic filmbases contemplated for use in the instant invention can be any suitable transparent material such as a cellulose organic ester, for example, cellulose acetate, cellulose formate, cellulose propionate, cellulose butyrate, cellulose acetate-propionate, cellulose acetate-butyrate, and the like, or cellulose nitrate as well as film-forming polymers, such as polyvinyl chloride, copolymers of vinyl chloride-vinyl acetate, copolymers of vinyl chloride-vinylidine chloride, polyamides, polystyrene, polycarbonates, polyethylene terephthalate, and the like.

In evaluating the relative static susceptibility of treated films prepared in accordance with the principles of this invention certain tests were conducted to determine the conductivity and resistivity of the treated films under test.

The relative static susceptibility can be determined by conductivity and resistivity measurements or by the use of the static generating and measuring device described in United States Patent 2,584,337. For a practical test which shows the actual static marks photographically, the film sample which is provided with a highly sensitive silver halide emulsion layer is submitted to the action of a highly effective static generator. For instance, the sample is placed on an insulated polystyrene plate and rubbed back and forth a predetermined number of times (usually 20 times) in the absence of light with a Nylon covered sponge rubber cushion. Development of the film with a suitable developer solution shows up the static marks and permits a practical evaluation of static susceptability with the relative grades of static assigned as follows: none; very light; light; medium; heavy; very heavy.

Surface resistivity, as defined inter alia in United States Patent 2,649,374, is an indication of the electrical resistance of the backing side of a film sample. It is determined by measuring the resistance in megohms between two electrodes. These values are influenced by the width and the spacing between the electrodes but this influence can be disregarded because the electrodes and their distance from each other are not changed during the comparison tests.

The following examples describe the manner in which the treatment of a film support of a cellulose derivative is effected. These examples are included for purposes of illustration only and are not intended to be construed as limiting the scope of the invention.

Example 1

A dimethyl formamide solution of a polymer of a vinylbenzyl quaternary ammonium compound containing 29 weight percent solids was diluted to 10 weight percent solids with methanol to form a stock solution.

Ten cubic centimeters of the 10 percent stock solution was then added to 90 cubic centimeters of methanol and the mixture coated on a 4-mil polycarbonate film support. The layer was observed to be completely transparent. Subsequently, after drying, the layer was conditioned at 48 percent relative humidity and static susceptibility measurements, as expressed by surface resistivity, at 48 percent relative humidity, were made by using contact electrodes 2 millimeters apart and 4 inches long. The surface resistitviy was found to be $4.2 \times 10^7$ ohms, which is well below the acceptable level of $10^4$ megohms for antistatic protection and below the level of current antistatic backwashes of $10^8$ ohms.

Example 2

Ten cubic centimeters of the 10 percent stock solution was added to 90 cubic centimeters of water and the mixture coated on a 4-mil polycarbonate film support. The layer was observed to be completely transparent. Subsequently, after drying, the layer was conditioned at 48 percent relative humidity and the static susceptibility measurements, as expressed by surface resistivity, at 48 percent relative humidity, were made by using contact electrodes 2 millimeters apart and 4 inches long. The surface resistivity was found to be $2.9 \times 10^7$ ohms.

Example 3

Ten cubic centimeters of the 10 percent stock solution was added to 65 cubic centimeters of acetone and 25 cubic centimeters of water. The mixture was coated on a 4-mil polycarbonate film support. The layer was observed to be completely transparent. Subsequently, after drying, the layer was conditioned at 48 percent relative humidity and the static susceptibility measurements, as expressed by surface resistivity, at 48 percent relative humidity, were made by using contact electrodes 2 millimeters apart and 4 inches long. The surface resistivity was found to be $7.0 \times 10^7$ ohms.

Example 4

Ten cubic centimeters of the 10 percent stock solution was added to 40 cubic centimeters of acetone and 50 cubic centimeters of methanol. The mixture was coated on a 4-mil polyester film support. The layer was observed to be completely transparent. Subsequently, the layer was conditioned at 48 percent relative humidity and the static susceptibility measurements, as expressed by surface resistivity, at 48 percent relative humidity, were made by using contact electrodes 2 millimeters apart and 4 inches long. The surface resistivity was found to be $5.5 \times 10^7$ ohms.

Example 5

The solution of Example 4 was applied to a cellulose triacetate film support. A defect-free layer with a surface resistivity of $5.8 \times 10^7$ ohms was obtained.

Various modifications of the invention will occur to persons skilled in the art. Thus, it is evident in lieu of the compounds of the specific examples, any of the compounds mentioned above can be employed with similar results. Therefore, it is not intended that the invention be limited in the patent granted except as necessitated by the appended claims.

What is claimed is:

1. A light sensitive photographic element comprising a film support carrying a silver halide emulsion layer, said element having an antistatic backing layer comprising a water-dispersible polymer consisting of at least one member of the group consisting of (a) homopolymers of a vinylbenzyl quaternary ammonium compound having the general formula:

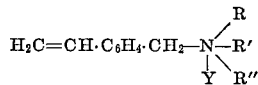

wherein R, R' and R" each represents individually a monovalent radical selected from the group consisting of $CH_2OH-CH_2$, $CH_3-CHOH-CH_2$
$CH_2OH-CHOH-CH_2-$ and alkyl, aryl, cycloalkyl and aralkyl hydrocarbon radicals, and R, R' and R" collectively represent the trivalent radical of the formula:

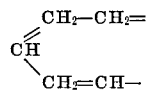

wherein the three valences are attached to the nitrogen atom, and Y is an anion, said R groups containing a total of not more than 12 carbon atoms in the substituent radicals, (b) copolymers of at least two of such vinylbenzyl quaternary ammonium compounds, (c) copolymers of at least 65 percent by weight of at least one of such vinylbenzyl quaternary ammonium compounds and not more than 35 percent by weight of acrylamide, and (d) copolymers corresponding to from 95.0 to 99.99 percent by weight of at least one of such vinylbenzyl quaternary ammonium compounds and from 5.0 to 0.01 percent by weight of divinylbenzene.

2. A light sensitive photographic element comprising a film support carrying a silver halide emulsion layer, said element having an antistatic backing layer comprising a water-dispersible polymer consisting of at least one homopolymer of a vinylbenzyl quaternary ammonium compound having the general formula:

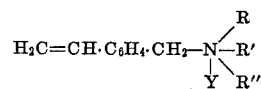

wherein R, R' and R" each represents individually a monovalent radical selected from the group consisting of
$CH_2OH-CH_2$, $CH_3-CHOH-CH_2-$ $CH_2OH-CHOH-CH_2-$ and alkyl, aryl, cycloalkyl and aralkyl hydrocarbon radicals, and R, R', and R" collectively represent the trivalent radical of the formula:

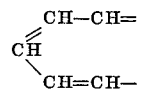

wherein the three valences are attached to the nitrogen atoms, and Y is an anion, said R groups containing a total of not more than 12 carbon atoms in the substituent radicals.

3. A light sensitive photographic element comprising a film support carrying a silver halide emulsion layer, said element having an antistatic backing layer comprising a water-dispersible polymer consisting of a copolymer of at least 65 percent by weight of a vinylbenzyl quaternary ammonium compound having the general formula:

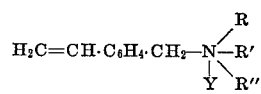

wherein R, R' and R" each represents individually a monovalent radical selected from the group consisting of
$CH_2OH-CH_2$, $CH_3-CHOH-CH_2-$ $CH_2OH-CHOH-CH_2-$ and alkyl, aryl, cycloalkyl and aralkyl hydrocarbon radicals, and R, R' and R" collectively represent the trivalent radical of the formula:

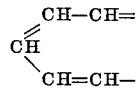

wherein the three valences are attached to the nitrogen atom, and Y is an anion, said R groups containing a total of not more than 12 carbon atoms in the substituent radicals, and not more than 35 percent of acrylamide.

4. A light sensitive photographic element comprising a film support carrying a silver halide emulsion layer, said element having an antistatic backing layer comprising a water-dispersible polymer corresponding to a copolymer consisting of from 95.0 to 99.99 percent by weight of a vinylbenzyl quaternary ammonium compound having the general formula:

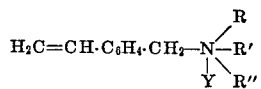

wherein R, R' and R" each represents individually a monovalent radical selected from the group consisting of CH₂OH—CH₂, CH₃—CHOH—CH₂—

CH₂OH—CH₂OH—CH— and alkyl, aryl, cycloalkyl and aralkyl hydrocarbon radicals, and R, R' and R" collectively represent the trivalent radical of the formula:

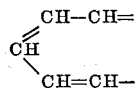

wherein the three valences are attached to the nitrogen atom and Y is an anion, said R groups containing a total of not more than 12 carbon atoms in the substituent radicals and 5.0 to 0.01 percent by weight of divinylbenzene.

References Cited

FOREIGN PATENTS 852,923  11/1960  Great Britain.

NORMAN G. TORCHIN, *Primary Examiner.*

R. H. SMITH, *Assistant Examiner.*